July 14, 1970
G. G. DUNBAR
3,520,430
LOADING AND HAULING APPARATUS
Filed Dec. 5, 1968
2 Sheets-Sheet 1
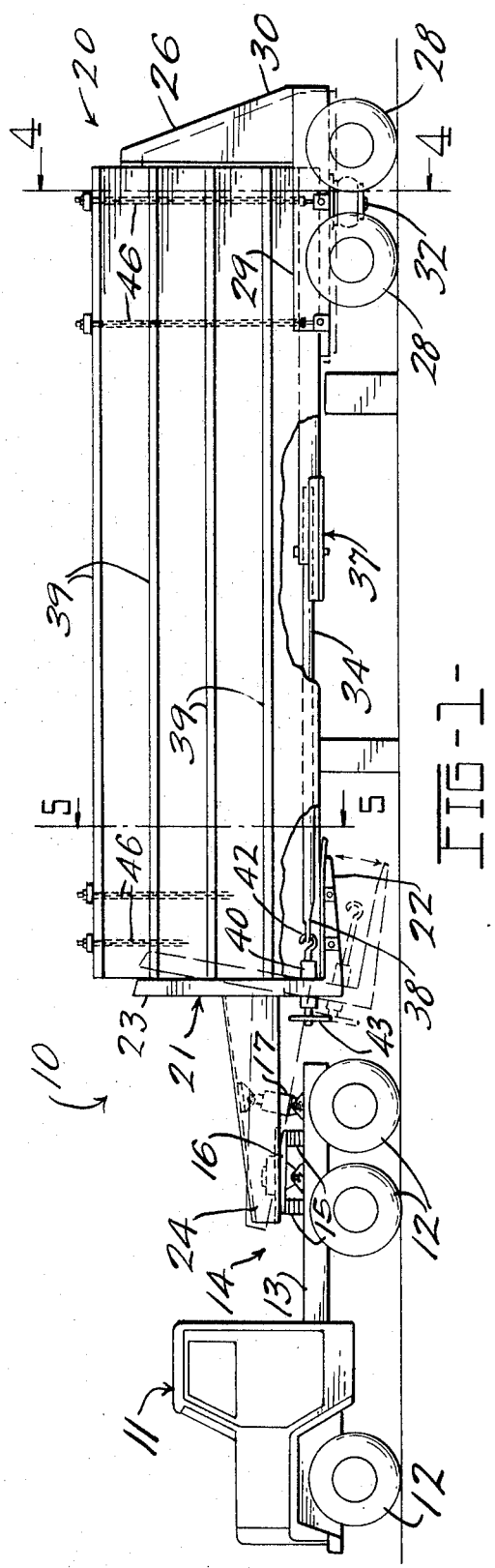
FIG-1-
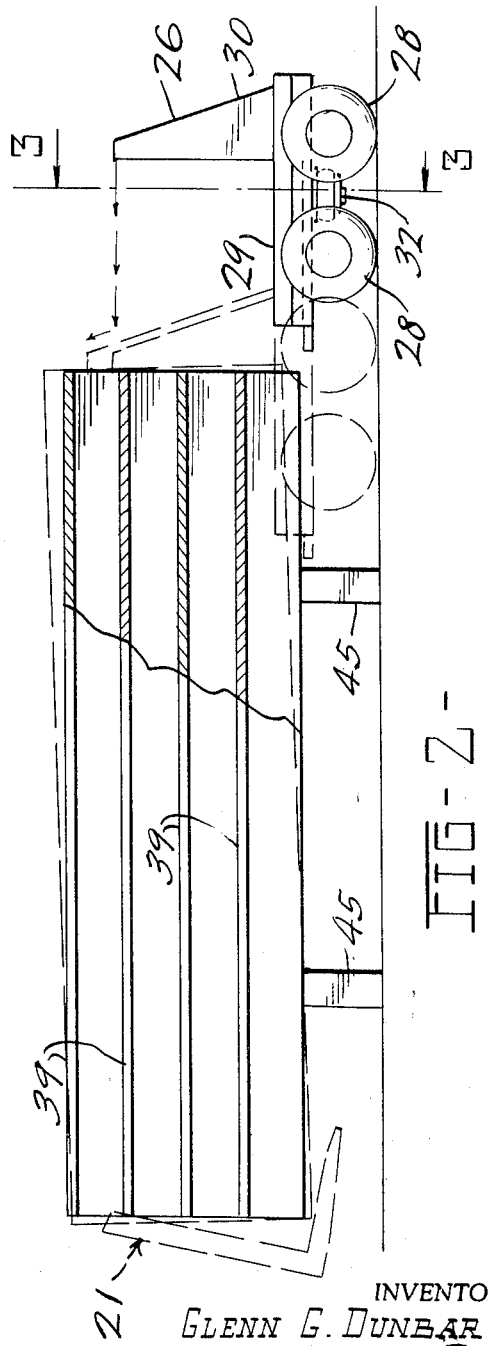
FIG-2-
INVENTOR:
GLENN G. DUNBAR.
BY
ATT'YS.

July 14, 1970          G. G. DUNBAR          3,520,430
LOADING AND HAULING APPARATUS
Filed Dec. 5, 1968                 2 Sheets-Sheet 2
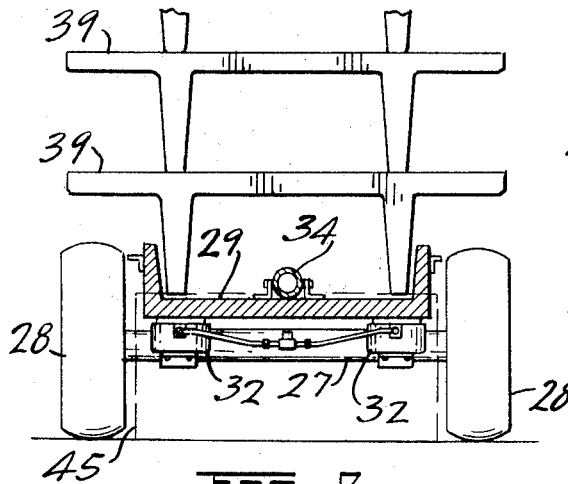
FIG-3-
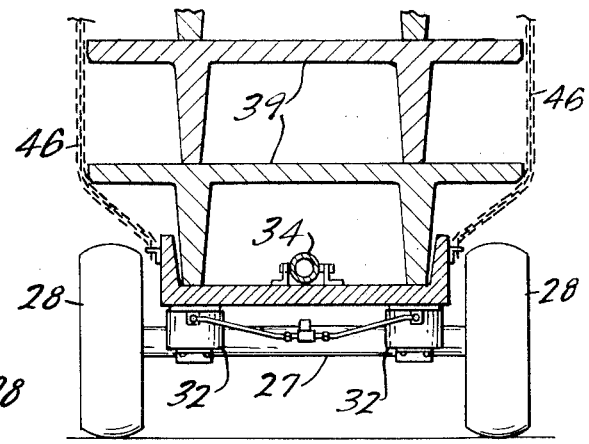
FIG-4-
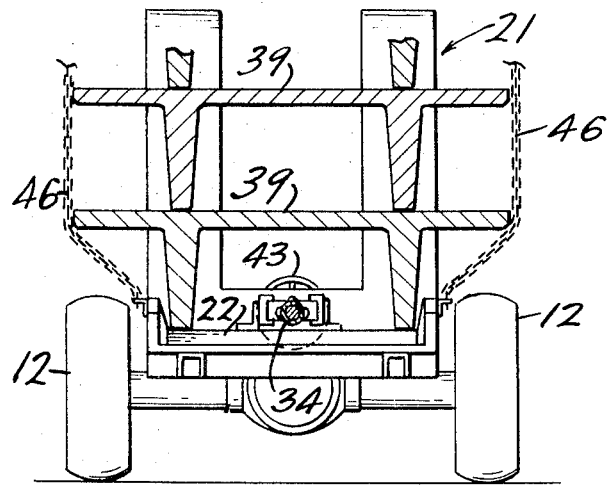
FIG-5-
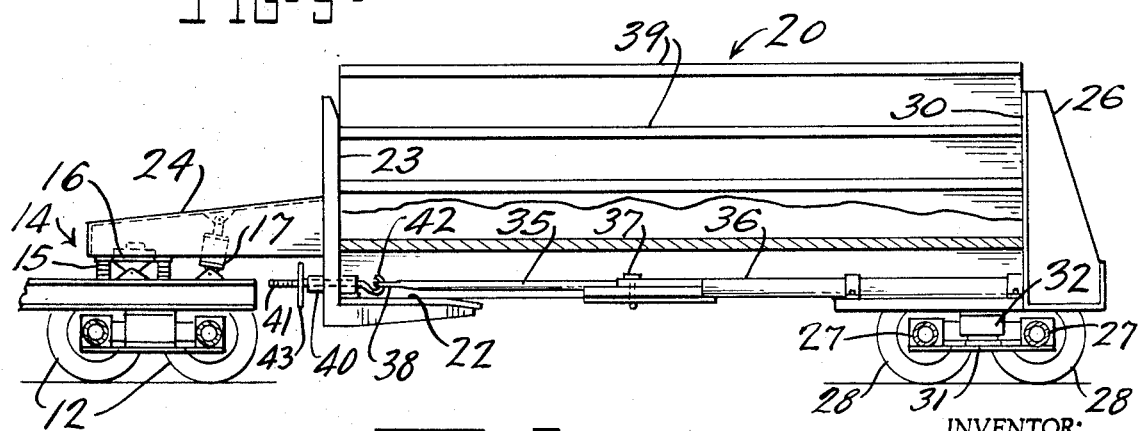
FIG-6-
INVENTOR:
GLENN G. DUNBAR.
BY
ATT'YS.

United States Patent Office 3,520,430
Patented July 14, 1970

3,520,430
LOADING AND HAULING APPARATUS
Glenn G. Dunbar, 2608 Overbrook Drive,
Toledo, Ohio 43614
Filed Dec. 5, 1968, Ser. No. 781,356
Int. Cl. B60p 1/64
U.S. Cl. 214—390
8 Claims

ABSTRACT OF THE DISCLOSURE

A tractor-trailer apparatus for the loading and hauling of heavy elongated objects. An air-lift fifth wheel is mounted on a rear portion of the tractor. The trailer includes front and rear support assemblies which are connected by an elongated adjustable tongue. The front support assembly includes a pivot member which engages the fifth wheel. A fluid cylinder is connected between the tractor and the front support assembly for rotating such assembly during loading and unloading. Fluid cylinders are positioned adjacent rear axles and the rear support assembly for elevating such assembly during loading and unloading. A tension assembly is provided for increasing the tension force on the tongue to compress the elongated objects between portions of the front and rear support assemblies during the transportation of the elongated objects.

BACKGROUND OF THE INVENTION

The handling of elongated heavy objects such as prestressed concrete beams has in the past often necessitated the use of both men and heavy equipment at the point of manufacture and also at the point of use. When the beams were delivered to the job site, if heavy equipment such as heavy-duty cranes were not available to unload the beams, the driver was obligated to wait until such equipment was available.

In addition, because of the load distribution of the heavy concrete beams, prior art trailers were often bulky and difficult to maneuver.

SUMMARY OF THE INVENTION

The present invention is a tractor-trailer apparatus which is capable of loading, transporting, and unloading heavy elongated objects without the use of cranes or similar equipment. In addition, the trailer, according to the present invention, provides apparatus for compressing the elongated objects during transportation which transfers the deadload of the beams to desired reaction points.

The present invention is a tractor-trailer assembly. The tractor includes driving mechanism, ground engaging wheels, and a fifth wheel mounted adjacent the rear of the tractor. The trailer has a front support assembly including a front bed, a front bulkhead, and a pivot member extending forwardly from the bulkhead. The pivot member includes means for engaging the fifth wheel of the tractor.

A rear support assembly is spaced from the front assembly and an elongated tongue extends between the front and rear support assemblies. The rear support assembly includes at least one rear axle having a pair of ground engaging wheels mounted thereon, a rear bed positioned above the axle, a rear bulkhead extending vertically from the rear bed, and means operatively connected between the axle and the rear bed for elevating the rear bed with respect to the axle. Means are provided for increasing the tension force on the elongated tongue to compress the objects being carried between the front and rear bulkheads. Means are also provided for rotatively moving the front support assembly.

It is the primary object of the present invention to provide an improved trailer for the loading, transportation, and unloading of heavy elongated objects such as prestressed concrete beams.

BRIEF DESCRIPTION OF THE DRAWINGS

FIG. 1 is a side elevational view of a tractor-trailer assembly according to the present invention and showing in dashed lines a rotated position of the front support assembly;

FIG. 2 is a fragmentary and partially diagrammatic elevational view showing the loading of elongated concrete beams by a tractor-trailer assembly constructed according to the present invention;

FIG. 3 is a fragmentary, vertical sectional view taken along the line 3—3 of FIG. 2 and shown on an enlarged scale;

FIG. 4 is a fragmentary, vertical sectional view taken along the line 4—4 of FIG. 1 and shown on an enlarged scale;

FIG. 5 is a fragmentary, vertical sectional view taken along the line 5—5 of FIG. 1 and shown on an enlarged scale; and FIG. 6 is a fragmentary, side elevational view showing the present trailer in a load carrying position.

DESCRIPTION OF THE PREFERRED EMBODIMENT

A tractor-trailer apparatus, according to the present invention, is generally indicated in FIG. 1 by the reference number 10. The tractor-trailer apparatus 10 includes a tractor 11 having driving mechanism (not shown), ground engaging wheels 12, and a rear portion 13. An air-lift fifth wheel 14 is mounted on the rear portion 13 of the tractor 11. The fifth wheel 14 includes air-lift cylinders 15 and a connector 16.

Referring to FIGS. 1 and 6, a trailer, according to the present invention, is generally indicated by the reference number 20. The trailer 20 includes a front support assembly 21 having a front bed 22 and a front bulkhead 23 extending perpendicularly from the front bed 22. A pivot member 24 is fixably connected to the front bulkhead 23 and extends forwardly of the bulkhead. The pivot member 24 has a front portion 25 which is engageable with the connector 16 of the fifth wheel 14.

A fluid cylinder 17 is connected between the rear portion 13 of the tractor 11 and the pivot member 24. The fluid cylinder 17 is effective to rotatively move the front support assembly 21 to position the assembly 21 during the loading and unloading operations.

The trailer 20 also includes a rear support assembly 26 which is spaced from the front support assembly 21. The rear support assembly 26 includes a pair of spaced rear axles 27 having ground engaging wheels 28 mounted on their outer ends. A rear bed 29 is positioned above the axles 27 and a rear bulkhead 30 extends vertically from the rear bed 29. A supporting frame 31 extends between the rear axles 27 and mounts a pair of fluid cylinders 32. The cylinders 32 are operatively connected between the rear axles 27 and the rear bed 29 and are effective to elevate the rear bed 29 with respect to the rear axles 27 during the loading and unloading of the trailer 20.

An elongated tongue 34 extends between the front support assembly 21 and the rear support assembly 26. The tongue includes two axially aligned elongated sections 35 and 36 which are connected together by a pin type connector 37. The connector 37 preferably has several pin openings (not shown) which provide for axial lengthening and shortening of the tongue 34. The rear tongue section 36 is fixably connected to the rear support assembly 26. A hook 38 is provided at the front end of the tongue section 35.

An important feature of the invention is that means are provided to increase the tension force on the tongue 34 to compress elongated objects, for example, reinforced beams 39 between the front bulkhead 23 and the rear bulkhead 30. Referring to FIG. 6, in the present embodiment, the tension means includes an interiorly threaded sleeve 40 which extends through and is connected to the center of the front bulkhead 23. An adjusting member 41 is threadably positioned within the sleeve 40. The adjusting member 41 has a pintle 42 at one end and mounts a hand wheel 43 at its other end.

Referring to FIG. 2, during a typical loading, transporting, and unloading operation, the precast concrete beams 39 are stored on supports 45 in the yard of the manufacturer. The rear fluid cylinders 32 are retracted and the rear support assembly 26 is rolled beneath one end of the beams 39 as shown by the dashed lines in FIG. 2. Referring to FIG. 3, the rear bed 29 is spaced below the lowermost surface of the lowest beam 39 at this time.

Referring to FIG. 1, the fifth wheel 14 is lowered and the air-lift cylinder 17 is activated. The front bed 22 is lowered and is also pivoted downwardly, as indicated by the dashed lines. The tractor 11 is move backwardly until the front support assembly 21 is adjacent the prestressed concrete beams 39. At this time, any necessary adjustment is made at the pin type connector 37 to vary the length of the tongue 34. The pintle 42 is connected to the tongue hook 38 and the fluid cylinder 17 is actuated. This pivots or rotates the front support assembly 21 into the solid line position shown in FIG. 1. At this time, the hand wheel 43 is rotated and the adjusting member 41 applies tension to the tongue 34. This in turn compresses the concrete beams 39 which are crowded between the front bulkhead 23 and the rear bulkhead 30. By this method, the deadload of the beams 39 is transferred to the rear support assembly 26 and also through the front support assembly 21, to the fifth wheel 14 and the rear portion 13 of the tractor 11.

The air-lift fifth wheel 14 and the rear fluid cylinders 32 are extended, elevating the beds 22 and 29 and lifting the beams 39 free from the supports 45.

FIG. 4 shows a cross section of the rear support assembly 26 after the beams 39 are in their travel position. At this time, the bottom surface of the lowermost beam 39 rests directly upon the rear bed 29. FIG. 5 is a similar view of the front support assembly 21. Safety chains 46 are provided around the beams 39.

At the job site, it is not necessary for the operator of the tractor-trailer apparatus 10 to wait until heavy equipment is available to unload the beams 39. Rather, the above described loading operation is reversed. The supports 45 are positioned beneath the load and the air-lift fifth wheel 14 and the rear cylinders 32 are retracted, lowering the front and rear beds 22 and 29. The tension on the tongue 34 is relaxed by rotating the hand wheel 43. The fluid cylinder 17 is activated to rotate the pivot member 24 and the remainder of the front support assembly 21 downwardly. The pintle 41 is disengaged from the tongue hook 38 and the tractor 11 and the attached front support assembly 21 can be moved from beneath the front end of the stacked beams 39. Similarly, the rear support assembly 21 can be removed from beneath the rear end of the beams 39.

While the present invention has been disclosed with a specific arrangement and disposition of the parts, it should be expressly understood that numerous modifications and changes may be made without departing from the scope of the appended claims.

What I claim is:

1. In a tractor-trailer assembly, the tractor including driving mechanism, ground engaging wheels, and a fifth wheel mounted adjacent the rear of the tractor, a trailer for the loading and hauling of heavy elongated objects, said trailer comprising, in combination, a front support assembly including a front bed, a front bulkhead extending vertically from said front bed and suitable for engaging the front of the elongated objects, and a pivot member fixably attached to and extending forwardly from said bulkhead, means on said pivot member for engaging the fifth wheel of the tractor, a rear support assembly spaced from said front support assembly, said rear support assembly including at least one rear axle having a pair of ground engaging wheels mounted thereon, a rear bed positioned above said axle, a rear bulkhead extending vertically from said rear bed and suitable for engaging the rear of the elongated objects, means operatively connected between said axle and said rear bed for elevating said rear bed with respect to said axle, an elongated tongue extending between said front support assembly and said rear support assembly, means for increasing the tension force on said elongated tongue to compress the elongated objects between said front and rear bulkheads, and means for rotatively moving said front support assembly to position same at least initially during loading.

2. A trailer according to claim 1, wherein said rear support assembly includes two rear axles horizontally spaced from one another, and wherein said elevating means includes two fluid lift cylinders connected between said two rear axles and said rear bed.

3. A trailer according to claim 2, wherein said elongated tongue has a hook at its front end, said tension force increasing means including an adjusting member mounted on said front bulkhead, said adjusting member having a pintle mounted at one end, said pintle being removably connectable with said hook and whereby rotation of said adjusting member is effective to increase the tension force on said elongated tongue.

4. A trailer according to claim 3, wherein said elongated tongue comprises two axially aligned elongated sections, and means for removably connecting said tongue sections to one another.

5. A trailer according to claim 1, wherein said means for rotatively moving said front support assembly includes at least one fluid cylinder connected between said front support assembly and the rear of the tractor.

6. A tractor-trailer assembly, for the loading and hauling of heavy elongated objects, comprising, in combination, a tractor including driving mechanism and ground engaging wheels, an air-lift fifth wheel mounted on the rear portion of said tractor, a front support assembly including a front bed, a front bulkhead extending vertically from said front bed and suitable for engaging the front of the elongated objects, and a pivot member fixably attached to and extending forwardly from said bulkhead, means on said pivot member for engaging said air-lift fifth wheel, at least one fluid cylinder connected between the rear portion of said tractor and said pivot member for rotatively moving said front support assembly for positioning same at least during loading, a rear support assembly spaced from said front support assembly, said rear support assembly including a pair of horizontally spaced rear axles having ground engaging wheels mounted thereon, a rear bed positioned above said axle, a rear bulkhead extending vertically from said rear bed and suitable for engaging the rear of the elongated objects, and two fluid cylinders connected between said rear axles and said rear bed effective to elevate said rear bed with respect to said axles, an elongated tongue extending between said front support assembly and said rear support assembly, and means operatively connected between said front support assembly and said tongue for increasing the tension force on said tongue to compress the elongated objects between said front and rear bulkheads.

7. A tractor-trailer assembly according to claim 6, wherein said tension force increasing means includes an adjusting member mounted on said front bulkhead, said adjusting member having one end removably connected to said elongated tongue, whereby rotation of said adjusting member is effective to increase the tension force on said tongue.

8. A tractor-trailer assembly according to claim 7, including a hand wheel mounted on one end of said adjusting member adjacent said front bulkhead.

References Cited

UNITED STATES PATENTS 2,531,694 11/1950 Larsen.
3,410,576 11/1968 Turpen _____ 280—423

ALBERT J. MAKAY, Primary Examiner

U.S. Cl. X.R.
214—512; 280—423